United States Patent [19]

Jones

[11] 4,109,694
[45] Aug. 29, 1978

[54] CLAMP REPAIR UNIT

[76] Inventor: Raymond Jones, 152 E. Market St., Long Beach, N.Y. 11561

[21] Appl. No.: 685,278

[22] Filed: May 11, 1976

[51] Int. Cl.² ............................................. F16B 43/00
[52] U.S. Cl. .................................... 151/69; 285/15
[58] Field of Search .................. 151/69, 41.7, 41.76, 151/41.75; 285/15; 403/21, 22, 286; 240/52.1, 73 QD, 103 R, 102 R; 16/DIG. 40

[56] References Cited

U.S. PATENT DOCUMENTS

| 1,070,292 | 8/1913 | Robb .............................. 240/52.1 X |
| 2,590,450 | 3/1952 | Parsons ........................ 151/41.75 X |
| 2,707,733 | 5/1955 | Steinharter ................... 240/73 QD |
| 2,888,971 | 6/1959 | Wootton ........................ 151/41.75 |
| 3,189,077 | 6/1965 | Willis et al. ..................... 151/69 |

Primary Examiner—Ramon S. Britts

[57] ABSTRACT

A unitary clamp repair unit for use about a cast boss which suitably engages about the boss and retains a fastener thereto.

3 Claims, 2 Drawing Figures

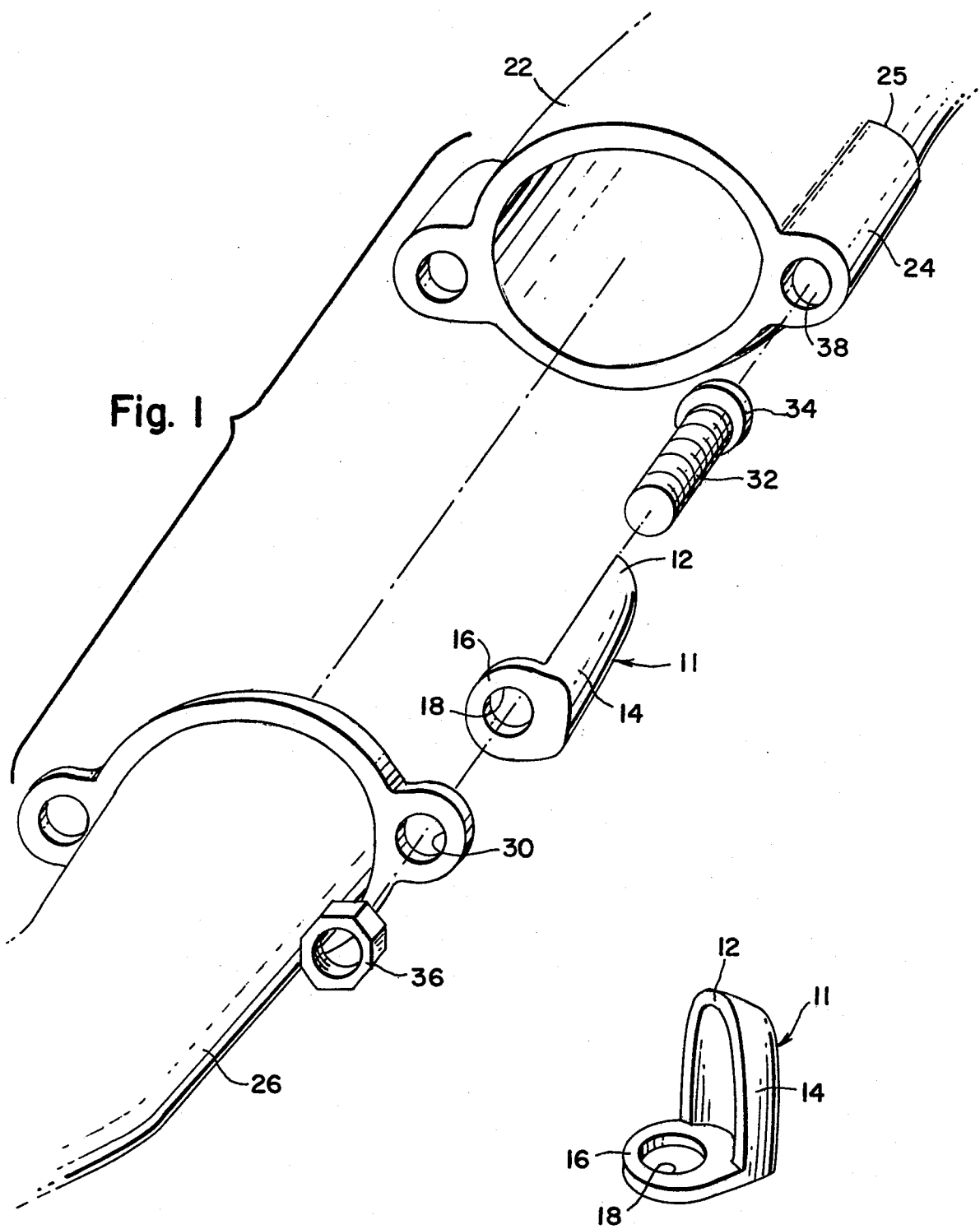

CLAMP REPAIR UNIT

BACKGROUND OF THE INVENTION

1. Field of the Invention

This invention relates to fasteners and, in particular, to threaded fasteners customarily engaged into cast bosses. It pertains especially to repair units for such fastening situations.

2. Description of the Prior Art

Fasteners are prehistoric. Threaded fasteners are, at the least, ancient. Many clamps have been proposed, used and patented. But a search of the pertinent prior art has failed to reveal any suitable repair units for clamps, bosses, and the like.

Further objects and advantages of this invention will appear more clearly from the following description of a non-limiting illustrative embodiment and the accompanying drawings in which like numerals designate like parts throughout the several views.

DESCRIPTION OF DRAWINGS

Briefly summarized, a preferred embodiment of the invention is described in conjunction with an illustrative disclosure thereof in the accompanying drawings, in which:

FIG. 1 is an exploded pictorial representation of the clamp repair unit as it might be applied to an automotive exhaust system according to the principles of this invention;

FIG. 2 is a pictorial view of the clamp repair unit.

FIG. 3 is a side view of the elements of FIG. 1 in assembled relationship.

SUMMARY OF THE INVENTION

It is therefore an object of this invention to overcome the limitations and disadvantages in the clamp repair devices in the prior art and currently available in the market.

One of the objects of the invention is to provide a clamp repair device embodying improved advanced principles of design and construction.

An important object of the invention is to provide a clamp repair device which is comprised of a minimum number of simple durable parts which can be economically manufactured and readily assembled.

A significant object of the invention is to provide a clamp repair device, so designed and constructed that it can be readily adapted to almost any typical clamp now in use.

Another object of the invention is to provide a clamp repair unit capable of field application by the typical unskilled consumer.

Yet another purpose of the invention is to provide a method for emergency repair of many typical castings.

A clamp repair unit, according to the principles of this invention, comprises a single part capable of engaging about a typical cast boss and retaining a suitable replacement fastener thereto.

DESCRIPTION OF TYPICAL EMBODIMENT

In the drawings a clamp repair unit 11 embodying features of the invention is illustrated intended to be placed about a typical projecting boss 24 which may be cast, and which may have been tapped 38 and the tapped hole is no longer usable either due to a broken bolt therein, or to a stripped or otherwise damaged thread. Part 12 which may be considered a hook, is intended to engage behind part 25 of boss 24.

The clamp repair unit 11 comprises a hook end 12, a bolt retaining end 16 which may have a hole 18 through which a fastener such as a bolt 32 may pass. The bolt end 16 joins the body 11 and side walls 14 may be provided. The clamp repair unit 11 may be a casting or a stamping or the like.

Using a common headed bolt, the head 34 is retained by end 16, permitting the bolt 32 to be used in an assembly and typically to be passed through hole 30 of a part to be assembled, such as muffler pipe 26 to be mounted to manifold 22 in which the threaded hole 38 is no longer available.

Threaded unit 36 may be assembled to bolt 32 and pulled up to form a tight joint.

This simple clamp repair unit 11 may be manufactured in any size and configuration to conform to any particular boss 24.

The applications are myriad. Anybody stuck with a usable machine and a broken bolt would appreciate salvaging his investment with a simple unit of this type.

From the foregoing, the construction and operation of the device will be readily understood and further explanation is believed superfluous.

The invention includes all novelty residing in the description and drawings. It is obvious to those skilled in the art that various minor changes can be made without departing from the concept of this invention and all such as fall within the reasonable scope of the appended claims are included.

What is claimed is:

1. A clamp repair unit to fit about a typical boss as found on a casting so as to retain a suitable fastener thereto, the unit comprising a unitary part formed of rigid metallic material having a half-hollow preferably semi-circular in cross section body portion, at one end of which is a transversely extending relatively flat fastener retaining portion defining a bearing surface defining a peripherally closed hole therethru into which a fastener, such as a bolt may fit, and at the other end the half-hollow body portion is closed forming a hook to fit behind and clampingly engage the boss so that the hook transfers the full tension load from the fastener to the boss.

2. A unit as in claim 1 further comprising a threaded fastener, such as a bolt.

3. A unit as in claim 2 further comprising a threaded nut.

* * * * *